Dec. 30, 1941.  H. C. McCURDY  2,268,078
THREAD CUTTING MACHINE
Filed Sept. 15, 1939  4 Sheets-Sheet 1

Inventor
Harry C. McCurdy
By
Eccleston + Eccleston
Attorneys

Dec. 30, 1941.  H. C. McCURDY  2,268,078
THREAD CUTTING MACHINE
Filed Sept. 15, 1939  4 Sheets-Sheet 2
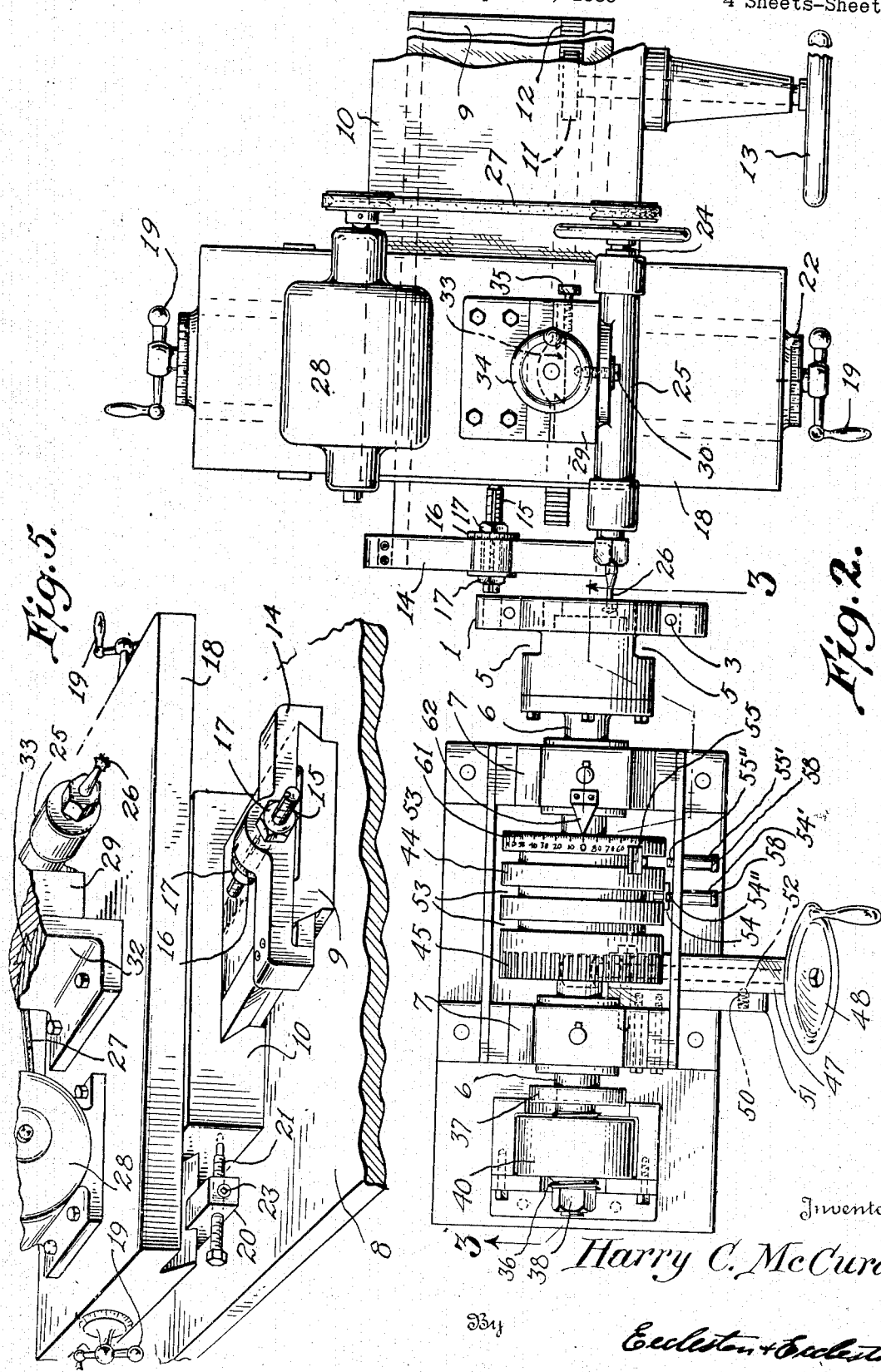
Inventor
Harry C. McCurdy
By Eccleston & Eccleston
Attorneys

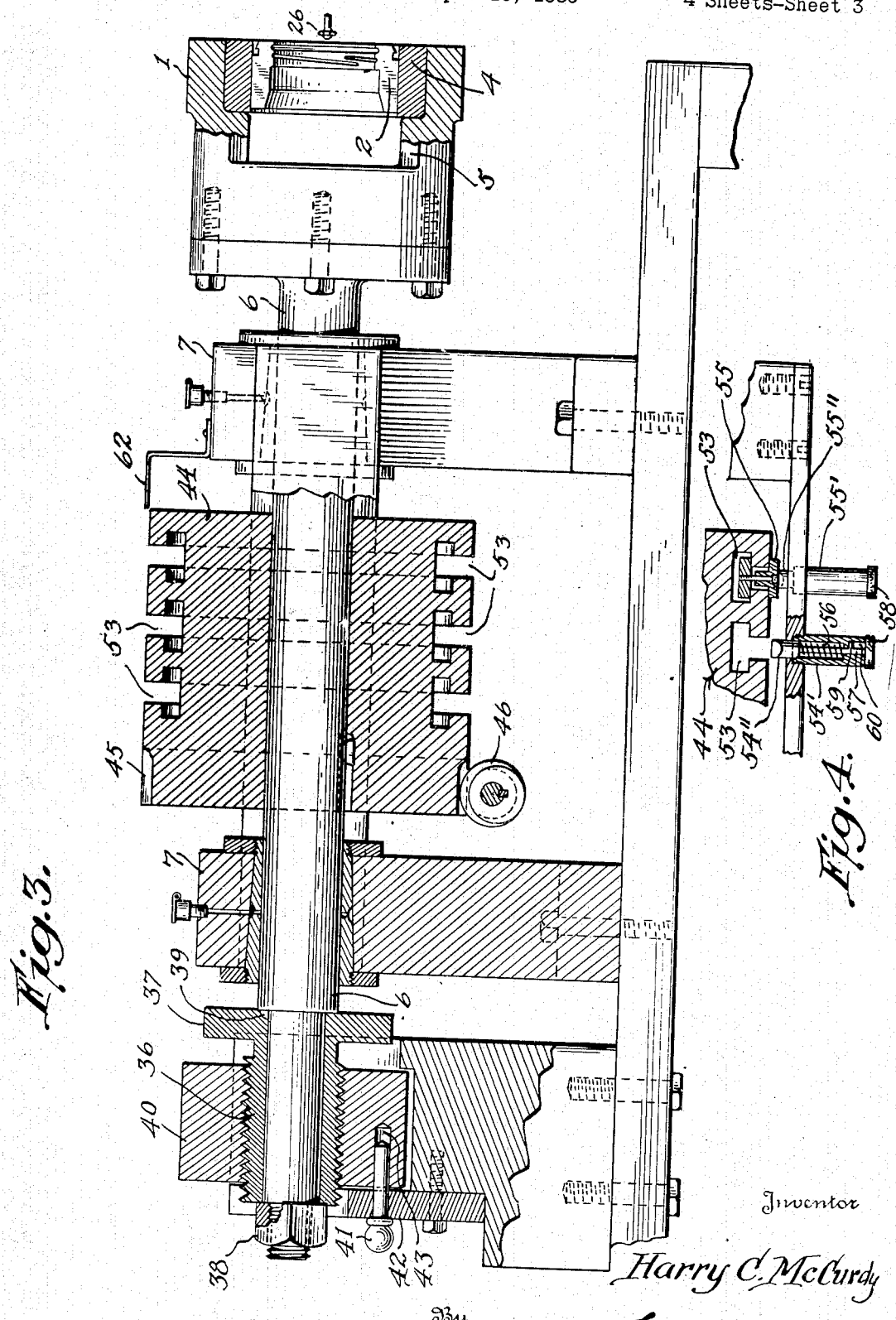

Dec. 30, 1941.   H. C. McCURDY   2,268,078
THREAD CUTTING MACHINE
Filed Sept. 15, 1939   4 Sheets-Sheet 4

Inventor
Harry C. McCurdy
By
Eccleston & Eccleston
Attorneys

Patented Dec. 30, 1941

2,268,078

UNITED STATES PATENT OFFICE 2,268,078

THREAD CUTTING MACHINE

Harry C. McCurdy, Zanesville, Ohio, assignor to Hazel-Atlas Glass Company, Wheeling, W. Va., a corporation of Virginia Application September 15, 1939, Serial No. 295,152

13 Claims. (Cl. 10—154)

The invention relates to an apparatus for cutting threads, and one of the objects of the invention is to provide a simple apparatus which is particularly adapted for the automatic cutting of threads in the finish or neck ring of glass molds.

Another object of the invention is to provide such an apparatus by which the extent of overlap of the thread may be regulated.

A further object of the invention is to provide means by which the depth of the thread may be varied.

Still another object of the invention is to provide means for regulating the distance, from the end of the ring, at which the cut starts.

A further object of the invention is to provide means for varying the pitch of the thread cut.

Another object of the invention is to provide an apparatus of this character which, when set for cutting a particular thread, will continue thereafter to produce the same thread, so that skilled labor is not required.

It is also an object of the invention to provide an apparatus of this character which will cut in the neck ring, the several types of threads commonly employed on glass containers.

Various other objects and advantages of the invention will be apparent to those skilled in the art, from the following detailed description, when taken in connection with the accompanying drawings, in which Figure 1 is a perspective view of the apparatus.

Figure 2 is a plan view thereof.

Figure 3 is a vertical sectional view taken on line 3—3 of Figure 2.

Figure 4 is a detail sectional view illustrating the latches.

Figure 5 is a detail perspective view illustrating certain adjustments.

Figure 1:
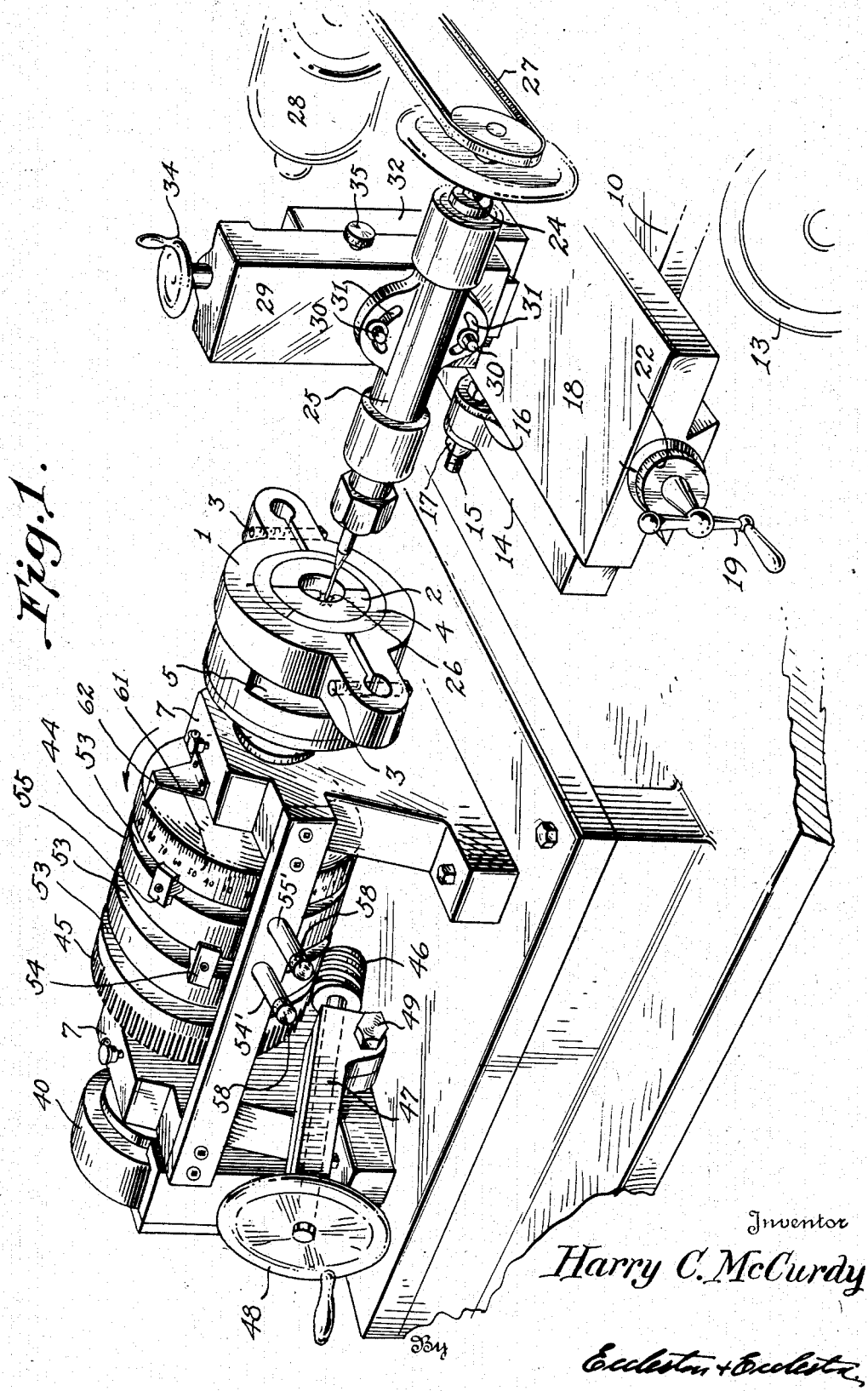

Referring to the drawings in more detail, numeral 1 indicates a chuck or holder for the work, such as a neck or finish ring 2, which is formed of half sections. The finish ring sections are clamped in the holder by means of bolts 3, and preferably a split ring 4 is arranged between the holder and the work, to provide for different sizes of finish rings.

The chuck or holder 1, which is preferably provided with openings 5 to permit the insertion of tools for removing the work, is carried by a spindle 6 mounted in bearings 7, 7.

Numeral 8 refers to a table for the cutting tool. On this table is a bed 9 upon which is mounted a slide 10 movable toward and from the work. For the purpose of adjusting the slide it carries a pinion 11 which meshes with a rack 12 on the bed 9. The pinion is operated by a handwheel 13.

Figure 6:
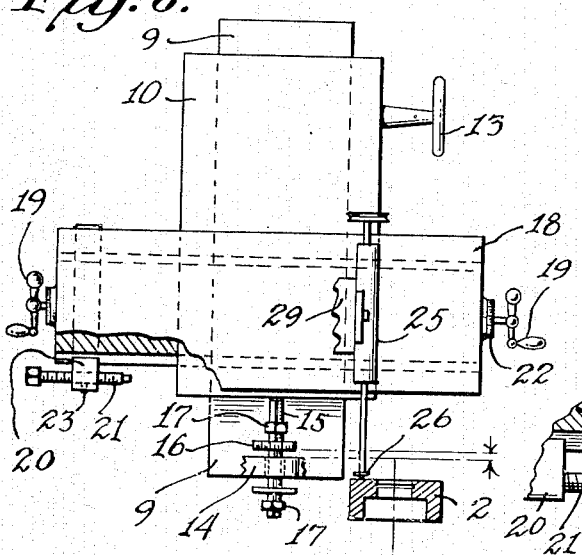
Figures 6, 7 and 8 are detail views illustrating the manner in which the tool is set for cutting a particular thread.
Figure 7:
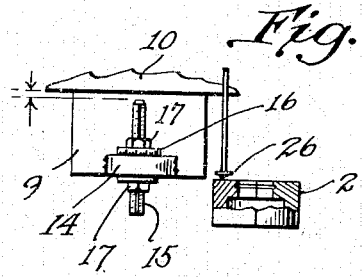
Figure 8:
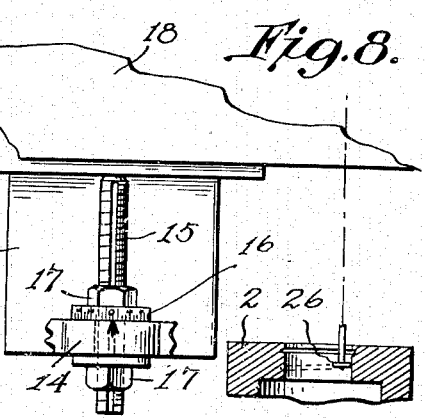

A bracket 14 is clamped to the forward end of the bed 9, and mounted therein is a threaded stop rod 15. The rod is keyed so that it cannot be rotated, but it can be adjusted longitudinally to thereby determine the forward limit of the slide 10, and hence determine the distance from the edge of the finish ring at which the thread will be started. For adjusting the rod an indexing ring 16 is threaded on the rod, and nuts 17 maintain the rod in adjusted position. When the stop is to be adjusted the nuts are loosened, and the indexing ring is rotated the desired amount, as shown in Figure 6. The indexing ring and the stop rod are then moved out until the ring abuts against the face of the bracket 14, and the nuts 17 are then screwed up, as shown in Figures 7 and 8.

Numeral 18 refers to a cross-slide which is mounted on the slide 10. The cross-slide is moved transversely of the slide 10 by an ordinary worm (not shown) operated by a handle 19. Preferably there is a handle at each end, so that the cross-slide can be adjusted from either side of the mechanism.

A bracket 20 is clamped to the under side of the cross-slide, and a stop rod 21 is in threaded engagement with the bracket. The end of the stop rod is adapted to engage the side of the slide 10, to limit the movement of the cross-slide, and determine the depth of the thread cut. To adjust the apparatus for a particular depth of thread, the parts are moved to the positions shown in Figure 8, with the cutting tool against the finish ring. The tool is then operated, without rotating the finish ring, and the cross-slide is moved to the desired extent, the extent of movement being regulated by an indexing ring 22. After the tool has cut to the desired depth, the threaded stop rod is rotated to bring its inner end into contact with the side of the slide 10. The stop rod is held in its adjusted position by means of a set screw 23.

Numeral 24 refers to the cutting tool spindle which is mounted in the bearing 25, and carries the cutting tool 26. The spindle and tool are rotated by a belt 27 driven by a motor 28 mounted on the cross-slide 18.

The bearing 25 is mounted on a slide 29, and preferably by means of bolts 30 passing through arcuate slots 31, whereby the bearing, and hence the cutter, may be adjusted about a horizontal axis. And the slide 29 is mounted on the bracket 32 by a dovetail 33; the bracket being carried by the cross-slide 18. The slide 29 is adjusted up or down by a worm (not shown) operated by a handwheel 34; and the slide is locked in adjusted position by a set screw 35.

By means of the above-described vertical adjustment of the cutter and the adjustment thereof about a horizontal axis, it is possible to vary the cross-sectional shape of the thread.

As mentioned hereinbefore, the chuck or holder 1 is carried by the spindle 6. Keyed to this spindle or shaft, adjacent the rear end thereof, is a lead screw 36 having a flange 37. The lead screw is secured on the shaft 6 by a nut 38, and is caused to rotate with the shaft by means of a key 39. Threaded on the lead screw is a lead screw nut 40, and for locating the nut and normally locking it against rotation, there is provided a removable pin 41 which passes through an opening in a stationary plate 42 and seats in a socket 43 provided in the nut 40.

Thus when the shaft 6 and the chuck or work holder are rotated, they will be fed forward at the desired rate, according to the pitch of the lead screw 36. When it is desired to cut threads of a different pitch, then of course another lead screw of the desired pitch is substituted.

Numeral 44 refers to an indexing drum, which is also keyed to the shaft or spindle 6. For the purpose of rotating the drum and shaft, the former is provided with gear teeth 45, meshing with a worm 46. The worm shaft is mounted in a bearing 47, and a handwheel 48 is provided for rotating the shaft. When the worm is rotated the finish ring or other work in the chuck 1 will be rotated, and of course the chuck and work will also be fed forward, as previously described.

In the particular embodiment illustrated herein the bearing 47 is pivotally mounted, as indicated by numeral 49. Thus by lifting the handwheel 48 the worm 46 will be thrown out of mesh with the teeth 45, and the indexing drum together with the shaft and chuck can be quickly turned by hand, for either returning the parts to their normal rearward position, or for making adjustments. Then when the parts are to be rotated by the worm, the handwheel is lowered to cause the meshing of the worm and gear teeth. For holding the worm out of mesh or in mesh a spring pressed ball 50 may be provided in a stationary arm 51, and adapted to temporarily engage in either of two sockets 52.

The indexing drum 44 is provided with a plurality of annular grooves or slots 53. There may be any desired number of these slots; there being three in the present embodiment. Numerals 54 and 55 refer to stops which are clamped in any desired position about the drum. There may be any desired number of these stops, and of course there may be a number of the stops in one or more of the grooves, depending on the work being done. But for the purpose of illustrating the invention there is shown only two of the stops, each in a separate groove or slot.

Numeral 54' refers to a housing for a latch 54" adapted to cooperate with stop 54, and numeral 55' refers to a housing for a latch 55" adapted to cooperate with stop 55. In the specific embodiment illustrated, the latch 54" has its inner end beveled on the top, and the latch 55" is beveled on the bottom. Both latches are urged inward by springs 56 mounted on the stems 57 of the latches. The inward movement of the latches is limited by the engagement of the housings by the heads 58 on the stems. Each of the stems is also preferably provided with a lug 59 which is normally in a slot 60 provided in the housing. The lugs perform two functions. When they are in the housings they prevent the latches from rotating, but when the latches are drawn back by hand they can be held in the withdrawn position by rotating the stems, so that the lugs will engage the rear ends of the housings. Thus any latch may be rendered inoperative, while adjustments are made, or for other purposes.

By means of the stops and the latches, it is possible to fix and vary the extent of overlap in the thread cut in the finish ring. Of course any desired overlap may be provided, but merely for the purpose of illustration suppose the desired overlap is 42°. In a manner which need not be described in any detail, the stops are set 42° apart; this setting being facilitated by the scale 61 on the drum, in cooperation with the fixed pointer 62.

Figures 9, 11, 12:
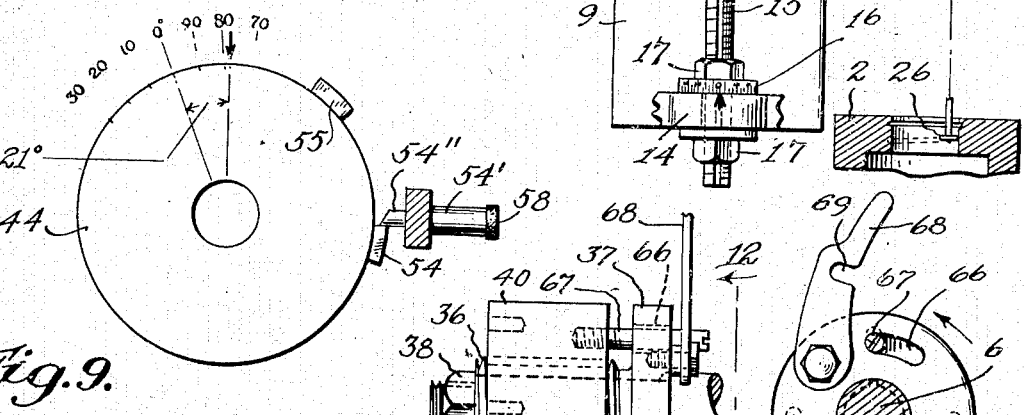
Figures 9 and 10 are detail views illustrating the manner in which the apparatus is set for determining the extent of overlap in the thread.
Figure 11 is a side view of a modified form of the apparatus, particularly adapted for cutting threads of the type shown in Figure 13.
Figure 12 is a vertical transverse sectional view taken on line 12—12 of Figure 11.

After the parts have been set, the position of the stops with relation to the latches is as shown in Figure 9, with the stop 54 just below the latch 54", and the stop 55 spaced 42° from stop 54 and spaced above the latch 55". Now when the drum is rotated to cut a thread, the stop 55 would strike the latch 55" after a rotation of 42°, but the operator withdraws the latch 55" to permit the stop 55 to pass, and the latch then snaps back into place. The rotation of the drum continues and the stop 54 strikes the beveled face of the latch 54" and pushes the latch back. The drum has now rotated 360°. The rotation continues for 42° further, until the stop 55 strikes the latch 55", thereby completing the desired cut.

In view of the foregoing detailed description of the apparatus, only a very brief description of the operation is necessary. The neck ring, or other work, is secured in the chuck, and of course the lead screw 36 and lead screw nut 40 are of a pitch to produce a thread of the required pitch. The cutting tool is given the necessary adjustments to produce a thread starting at the desired distance from the end of the work, to produce a thread of the desired depth, and to produce a thread of the desired cross-sectional shape. The distance from the end of the work at which the thread starts, and the depth of the thread, are regulated by the several adjustments previously described in detail, and illustrated by Figures 6, 7 and 8. The cross-sectional shape of the thread is regulated by the adjustment of the cutting tool about a horizontal axis, together with the vertical adjustment of the tool, as has also been previously described, and illustrated by Figure 1. The desired extent of overlap of the thread is regulated by the adjustment of the stops 54 and 55 and the cooperating latches 54" and 55", as also previously described.

All of the adjustments having been made, the cutter is started, and the worm 46 is then rotated by the handwheel 48, to cause the rotation of the finish ring, the indexing drum and the lead screw. Thus a thread of the exact requirement will be cut in the finish ring or other work, and without any further adjustment any desired number of finish rings, duplicating the first, can be quickly produced.

Another form of thread or finish commonly employed on glass containers, has an inclined portion and a straight portion, which is known as the Amerseal finish. In describing the apparatus for cutting this particular thread in a finish ring, reference is to be had to Figures 11, 12 and 13.

Figure 13:
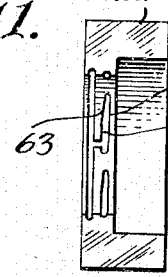
Figure 13 is an elevational view of a neck or finish ring section, showing the particular threads cut with the attachment shown in Figures 11 and 12.
Figure 10:
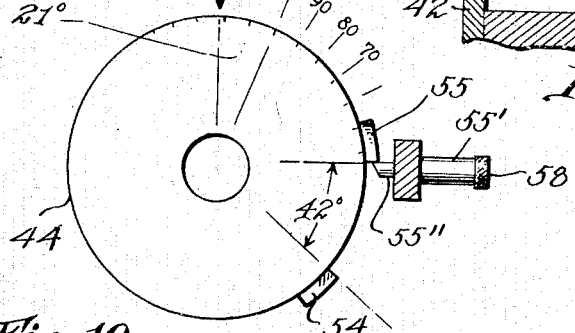

In Figure 13 there is shown a finish ring section provided with an angle-straight or Amerseal thread. The thread has an inclined or angle portion 63, followed by a straight portion 64. The top of the thread, referred to by numeral 65, is straight throughout. There may be two, three or four of these threads.

The attachment shown in Figures 11 and 12 is particularly adapted to the cutting of such threads, but it is to be understood that the attachment may form a permanent part of the entire apparatus, so that the apparatus may cut these particular threads when desired, as well as the common forms of spiral threads.

Referring now to these Figures 11 and 12, numeral 6 indicates the shaft, 36 indicates the lead screw keyed to the shaft, 37 indicates the flange integral with the lead screw, 38 indicates the nut on the end of the shaft, and 40 indicates the lead screw nut, which is normally held against rotation by the removable pin 41, all as previously described.

The only additions to the previously described structure, are that the flange 37 is provided with an arcuate slot 66 adapted to cooperate with a pin 67 removably screwed into the lead screw nut 40, and a latch 68 pivotally mounted on the flange 37 and having a notch 69 adapted to engage over the screw 67 when required.

Assuming the parts are in the positions shown in Figures 11 and 12, then when the shaft or spindle starts to rotate in the direction indicated by the arrow, the flange 37 and the integral screw 36 will rotate with the shaft, and the nut 40 will be held against rotation by the pin 41, so that the tool will cut the angle portion 63. Thus the operation so far is exactly as described hereinbefore. But during this rotation the pin 67 is riding in the slot 66, and when the end of the slot strikes this pin there can be no further rotation of the parts. Then the pin 41 is withdrawn, and the shaft, the lead screw flange, the lead screw, and the lead screw nut will all rotate together as a unit, so there will be no advancement of the work holder and work, and hence the tool will cut the straight portion 64. The parts are now returned to their original positions, and the latch 68 is swung down so that the notch 69 therein will engage the pin 67. The pin 41 is still withdrawn, and when the shaft is again rotated, of course, all of the parts rotate together, so that there will be no advancement of the work, and the tool will cut the top portion 65 of the thread.

It will be understood, of course, that in cutting this particular type of thread, the stops 54 and 55, and the latches 54" and 55" will limit the extent of the cuts, as previously described. Also, when the angle portion 63 of the threads is to be of a different length, the slot 66 will be of a different length.

It will also be understood that the attachment shown in Figures 11 and 12 may be secured on the apparatus whenever it is desired to cut the angle-straight thread, or it may form a regular part of the apparatus, so that the machine may be used for cutting the ordinary types of spiral threads or the angle-straight thread. When this attachment has been used for cutting angle-straight threads, it is only necessary to remove the pin 67, to render the apparatus operative to cut spiral forms of threads.

Having fully described the invention, what I claim is:

1. A milling machine for cutting threads, including means for adjusting the depth of the thread, and limiting means causing the same depth to be reproduced, means for adjusting the cross-sectional shape of the thread, means for adjusting the distance from the end of the work at which the thread is started, and means for adjusting the extent of the thread overlap.

2. A milling machine for cutting threads, including means for adjusting the depth of the thread, and limiting means causing the same depth of thread to be reproduced, means for determining the distance from the end of the work at which the thread is started, and means for determining the extent of the thread overlap.

3. A milling machine for cutting threads, including a chuck for holding the work, means for rotating and advancing the chuck, a bed plate, a slide mounted on the bed plate, means for adjusting the slide toward and from the work, an adjustable stop mounted on the bed plate and adapted to be engaged by said slide to limit its movement toward the work, a cross-slide mounted on the first-mentioned slide, means for adjusting the cross-slide transversely of the first-mentioned slide, an adjustable stop mounted on the cross-slide and adapted to engage the first-mentioned slide to limit the movement of the cross-slide, a vertically adjustable slide mounted on the cross-slide, and a cutter carried by the vertically adjustable slide.

4. A milling machine for cutting threads, including a rotatable shaft, bearings for said shaft, a chuck for carrying the work secured to said shaft, a rotary cutting tool, a lead screw for advancing the shaft and chuck, said lead screw being rotatable with the shaft, a lead screw nut threaded on the lead screw and free of said bearings, a stationary member, a pin adapted to be removably inserted in said stationary member and lead screw nut, said pin when in place holding the nut stationary, whereby the shaft and chuck are advanced when rotated, and the removal of said pin permitting the lead screw nut to freely rotate with the shaft, whereby the shaft and chuck will not advance when rotated.

5. A milling machine for cutting threads, including a rotatable shaft, a chuck for carrying the work secured to the shaft, a rotary cutting tool, a lead screw for advancing the shaft and chuck, said lead screw being rotatable with the shaft, a lead screw nut mounted on the lead screw, a removable pin for preventing the nut from rotating with the lead screw, and another removable pin for causing the nut to rotate with the lead screw, whereby the chuck, when rotated, may be caused to advance, or prevented from advancing, with respect to the cutting tool.

6. A milling machine for cutting threads, including a rotatable shaft, a chuck for carrying the work secured to said shaft, a rotary cutting tool, a lead screw for advancing the shaft and chuck, said lead screw being rotatable with the shaft, a lead screw nut mounted on the lead screw, and means permitting the lead screw to rotate with respect to the nut for a portion of the rotation of the shaft to cause longitudinal advancement of the shaft and chuck, and causing the lead screw and nut to rotate together during another portion of the rotation of the shaft to prevent longitudinal advancement of the shaft and chuck.

7. A milling machine for cutting threads, including a rotatable shaft, a chuck for carrying the work secured to said shaft, a rotatable cutting tool, a lead screw for advancing the shaft and chuck, said lead screw being rotatable with the shaft, a flange on the lead screw, a lead screw nut mounted on the lead screw, said flange having a slot, a pin attached to the nut and travelling in said slot, whereby the lead screw rotates with respect to the nut during one period of rotation of the shaft, and is prevented from rotating with respect to the nut during another period of rotation of the shaft.

8. A milling machine for cutting threads, including a rotatable shaft, a chuck for carrying the work secured to said shaft, a rotatable cutting tool, a lead screw for advancing the shaft and chuck, said lead screw being rotatable with the shaft, a flange on the lead screw, a lead screw nut mounted on the lead screw, said flange having a slot, a pin attached to the nut and travelling in said slot, and means carried by said flange for locking the pin against relative movement in the slot.

9. A milling machine for cutting threads, including a rotatable shaft, a chunk for carrying the work secured to said shaft, a rotatable cutting tool, a lead screw for advancing the shaft and chuck, an indexing drum rotatable with the shaft, said drum having annular grooves, stops adjustably positioned in said grooves and angularly spaced apart the number of degrees equal to the number of degrees of thread overlap desired, and latches arranged in a single horizontal plane and adapted to cooperate with said stops.

10. A milling machine for cutting threads, including a rotatable shaft, a chuck for carrying the work secured to said shaft, a rotatable cutting tool, an indexing drum rotatable with the shaft, said drum having annular grooves, stops adjustably positioned in said grooves and angularly spaced apart the number of degrees equal to the number of degrees of thread overlap desired, latches arranged in the path of and adapted to cooperate with said stops, one of said latches being movable outward by one of said stops to permit the passage of such stop.

11. A milling machine for cutting threads, including a rotatable shaft, a chuck for carrying the work secured to said shaft, a rotatable cutting tool, an indexing drum rotatable with the shaft, said drum having annular grooves, stops adjustably positioned in said grooves, latches arranged in the path of and adapted to cooperate with said stops, and at least one of said latches being manually withdrawable from the path of one of the stops.

12. A milling machine for cutting threads, including a rotatable shaft, a chuck for carrying the work secured to said shaft, a rotatable cutting tool, an indexing drum rotatable with the shaft, said drum having annular grooves, stops adjustably positioned in said groves, latches arranged in the path of and adapted to cooperate with said stops, one of the latches being operated by one of the stops to permit its passage, and the other latch preventing the passage of a stop.

13. A milling machine for cutting threads, including a rotatable shaft, a chuck for carrying the work secured to the shaft, a cutting tool, and means for cutting an angle-straight thread in the work, said means including means for advancing the work longitudinally relative to the cutter during a partial rotation of the work, and maintaining the work against longitudinal advancement during an immediately succeeding partial rotation of the work, the cutting tool being in engagement with the work during both partial rotations.

HARRY C. McCURDY.